United States Patent [19]

Goker

[11] Patent Number: 5,136,561
[45] Date of Patent: Aug. 4, 1992

[54] DISK DRIVE WITH TARGET TRACK ACQUISITION

[76] Inventor: Turguy Goker, P.O. Box 814, Salona Beach, Calif. 92075

[21] Appl. No.: 637,147

[22] Filed: Jan. 3, 1991

[51] Int. Cl.$^5$ .............................................. G11B 17/22
[52] U.S. Cl. .................................. 369/32; 369/44.28; 360/78.4
[58] Field of Search ................... 369/32, 33, 41, 44.28; 360/78.1, 78.4, 78.5, 78.6, 78.7, 78.8, 78.9, 78.11, 78, 12, 78.13, 78.14

[56] References Cited

U.S. PATENT DOCUMENTS

| | | | |
|---|---|---|---|
| 4,297,734 | 10/1981 | Laishley et al. | 360/78.6 |
| 4,535,372 | 8/1985 | Yeakley | 360/77.5 |
| 4,958,245 | 9/1990 | Roth et al. | 360/77.3 |
| 5,025,330 | 6/1991 | Nishimiya | 360/78.4 |

*Primary Examiner*—Roy N. Envall, Jr.
*Assistant Examiner*—Thai Tran
*Attorney, Agent, or Firm*—Herbert M. Shapiro

[57] ABSTRACT

A disk drive for a disk file includes means for generating a unique reference position profile for moving the actuator for the servo head over the distance to the target track. The route for the actuator is prescribed and a fixed time period for traversing the distance is prescribed. The control signals control the actuator position not the speed of the motor or the attending velocity feedback loop of prior art systems. The resulting operation is a time optimal, incremental positioning mechanism which eliminates torque and friction problems as well as overshoot and settling problems.

14 Claims, 8 Drawing Sheets

DISK DRIVE WITH TARGET TRACK ACQUISITION

FIELD OF THE INVENTION

This invention relates to disk drives and more particularly to an electromechanical system for positioning the read write-heads in a disk drive.

BACKGROUND OF THE INVENTION

Information is stored in disk files in radial tracks defined in the disk surface as is well known. The writing of information into those tracks and the reading of information from those tracks is carried out by a set of read-write heads which are moved to a selected or target track in response to positioning commands from a computer controlling the disk drive. Two types of head positioning systems are used. One uses a dedicated servo surface; the other, an imbedded system as is well understood. The description will be rendered herein in terms of a dedicated servo system.

The set of read-write heads are mounted rigidly on an actuator responsive to computer commands. The actuator responds to position the heads correctly with respect to the target track. The quality of a disk file is determined, to a large extent, by the time it takes, on the average, to reposition the heads at a newly selected position once a command is given.

Typical commercially available disk drives include servo loops operative to control the movement of the actuator. The purpose of the servo loop is to perform a seek function followed by a tracking function in response to a "new track" or target track position command. Once the actuator reaches the target position, the servo searches for the target track center.

Two separate servo loops are involved; the seek servo and the tracking servo. The seek servo operates to move the actuator as fast as possible (maximum velocity) to the target track in a manner so that the actuator moves at zero velocity when it reaches the target track center. The seek servo basically determines the disk drive's most important specification, "ACCESS TIME" and "SINGLE TRACK SEEK TIME". The present invention is directed at achieving relatively short access times especially for the single track seek specification.

Prior art seek servo systems operate as follows: The actuator is moved at maximum velocity until the position error reaches a preselected value. Thereafter, the velocity is controlled, according to a formula, which reduces the velocity from the maximum velocity in a manner proportional to the position error.

An inner velocity loop is provided for controlling the estimated actuator speed with respect to the computed speed as defined by the formula. This inner loop is called "the first order proportional velocity servo loop". The loop operates to amplify the velocity error by the proportional gain to control the estimated feedback to the actuator. Because the frictional term is present and is normally not a constant, and because a finite error gain exists, there will always be a finite velocity error which has to be as large as possible for the system in order to ensure that the velocity approaches zero at the target track. In order for the velocity to approach zero, the feedback also must approach zero so that when the switch from the seek servo to the tracking servo occurs, the actuator will not overshoot the track center causing long settling times or causing the target track to be missed altogether.

In practice, the actuator is positioned by a motor, the current in which is controlled as described above. The amplitude of the motor current (and thus the velocity of the actuator) is proportional to the distance between the start position and the target position for the head (i.e. the position error). In practice, prior art systems generate a "position signal" from the servo head. A derivative of the position signal is calculated and a velocity signal is generated from the derivative. The current which is generated in the actuator motor is proportional to the velocity error signal. The closer the actuator is to the target track, the smaller the velocity signal and the lower the current in the actuator motor.

But the motor current control signal is actually a velocity error times gain signal. Although, the velocity signal amplitude approaches zero as the actuator approaches the target track, the gain increases also approaching an infinite value. The resulting positioning control is thus nonlinear and produces a relatively long access time.

The present invention is directed at providing a disk drive with a relatively short access time and an improved switch from the seek to the tracking servo.

BRIEF DESCRIPTION OF AN ILLUSTRATIVE EMBODIMENT OF THIS INVENTION

In accordance with the principles of this invention, a unique reference position profile is generated for moving the actuator over the distance to the target track. The route for the actuator is prescribed and a fixed time period for traversing the route is predetermined. Although the velocity of the actuator will vary during the route, the control signals control the actuator position not the speed of the motor driving the actuator. The resulting operation is a time optimal, incremental positioning mechanism which eliminates torque and friction problems and eliminates overshoot and settling problems as well.

Specifically, a disk drive in accordance with the principles of this invention includes a single "position servo" rather than the seek and tracking servos of prior art disk drives. Further, a position profile is generated for any track distance in accordance with a single algorithm. The algorithm is used to generate a reference signal with respect to which the position servo adjusts the position profile enroute without the need of velocity feedback.

DETAILED DESCRIPTION OF AN ILLUSTRATIVE EMBODIMENT OF THIS INVENTION

Figure 1:
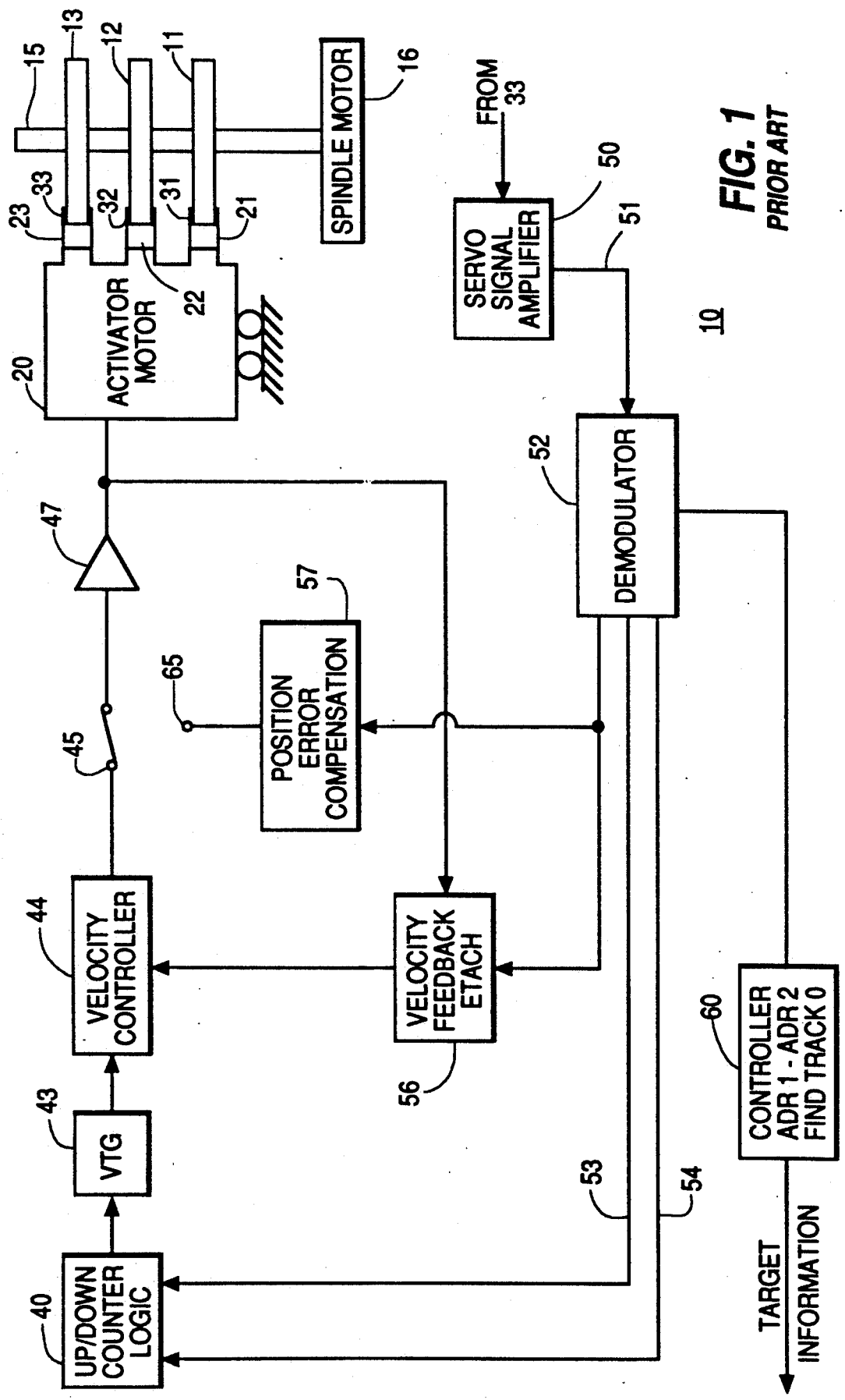
FIG. 1 is a schematic block diagram of a prior art disk drive system.

FIG. 1 shows a prior art disk drive system 10. The system includes a plurality of disks 11, 12, and 13 stacked on a spindle 15 and driven by spindle motor 16. Disk 13 is a dedicated servo head and the description herein will be rendered, illustratively, in terms of a dedicated servo head system.

The system also includes an actuator motor 20 which has three actuators 21, 22, and 23, actuator 23 corresponding to the dedicated servo surface 13. Read-write heads 31, 32, and 33 are mounted on activators 21, 22, and 23 respectively. The system of FIG. 1 is operative to move the actuator from the position of its last track target to that of its new target as quickly as possible and. in a manner to avoid overshooting the target track. The system accomplishes the task with two mechanisms embodied in seek and tracking servos, the first to control the movement to the target track, the second to find the center of the track once the head reaches the track. The servo loops are responsive to feedback signals generated with respect to the dedicated servo surface 13 as will be dicussed in connection with FIGS. 1, 3, and 4.

First, the seek and tracking servo loops are described in connection with FIG. 1. The system of FIG. 1 includes an up/down counter logic circuit 40 to which the target track address information is applied as indicated by arrow 41. The output of logic block 40 is connected to the input to velocity target generator (VTG) represented by block 43. The output of block 43 is connected to an input to velocity controller 44. The output of controller 44 is connected via switch 45 to the input of current amplifier 47. The output of amplifier 47 is connected to actuator motor 20.

The output of head 33 is connected to the input of servo signal amplifier 50 as indicated by arrow 51. The output of amplifier 50 is connected to demodulator 52. First and second outputs 53 and 54 of demodulator 52 are connected to inputs to up/down counter logic circuit 40. An output of demodulator 52 also is connected to a velocity feedback circuit (ETACH) represented by block 56, the output of which is connected to the input of velocity controller 44. The output of amplifier 47 is also connected to the input of circuit 56. Another output of demodulator 52 is connected to the input of position error compensator 57, the output of compensator 57 being connected to switch 45. An output of demodulator 52 is connected to the input of controller 60 which generates target information at its output.

The system of FIG. 1 operates as follows: The actuator 23 (and thus 21 and 22) is accelerated at the maximum rate (X) until the position error (the target position minus the present position) reaches a preselected value Xe. The actuator velocity is then controlled according to the formula $$X = V = (signXe)/AmaxXe \qquad (1)$$

where Amax is the maximum possible acceleration for the system. The velocity V becomes smaller as the actuator nears the target position. The operation of equation 1 is performed by velocity target generator 43. The inner velocity servo loop, the seek servo loop, operates to compare the estimated actuator speed (via velocity feedback circuit 56) to the reference speed computed by velocity target generator 43. The computation takes into account that the velocity error (Ve) is amplified by the proportional gain (Krel) to control the estimated feedback (Vf). Because there always is a frictional term, which is not a constant, and a finite velocity error gain, there is always a finite velocity error in this system.

The seek servo loop of the system of FIG. 1 thus includes amplifier 50, demodulator 52, logic circuit 40, velocity target generator 43, velocity controller 44, velocity feedback circuit 56, and amplifier 47. Remembering that a disk drive has a "zero" track with respect to which all track movements are referred (courtesy of controller 60), each track crossing sensed by head 23 is applied to amplifier 50, via demodulator 52 to logic circuit 40 via representative line 53 and the number of such crossings is applied to logic circuit 40 via line 54. A velocity signal proportional to the square root of the distance to the target track is generated and controls the current in the actuator motor. Because the velocity is a function of distance to the target track and because that distance is a decreasing distance, the velocity signal and thus the current in the actuator motor is continually reducing ideally to approach zero at the target track.

Once the actuator reaches the center of the target track, the tracking servo loop takes over the control of the actuator movement. The servo loop comprises amplifier 50, demodulator 52, and compensator 57. The switch between the seek servo loop and the tracking servo loop is controlled by the position error compensator (integrator) 57 to switch to position 65 for the tracking operation.

Compensator 57 is held at zero volts during the seek mode. The actuator, at the center line of the target track has a minimum velocity. As the actuator moves from the center line (overshoots), the position error increases and compensator 57 applies a current in a direction to pull the actuator back to the target track center line. The operation of the tracking servo loop, velocity error and friction determine the settling time.

It is clear that seek time and settling time of prior art systems depend heavily on the accuracy of velocity feedback estimations which lacks high signal to noise ratio at low frequencies of noise and random frictional distrubances. Also, the seek servo loop is characterized by relatively large overshoots and long settling times, and particularly for short track seeks (i.e. such as a single track seek), long seek times.

Figure 2:
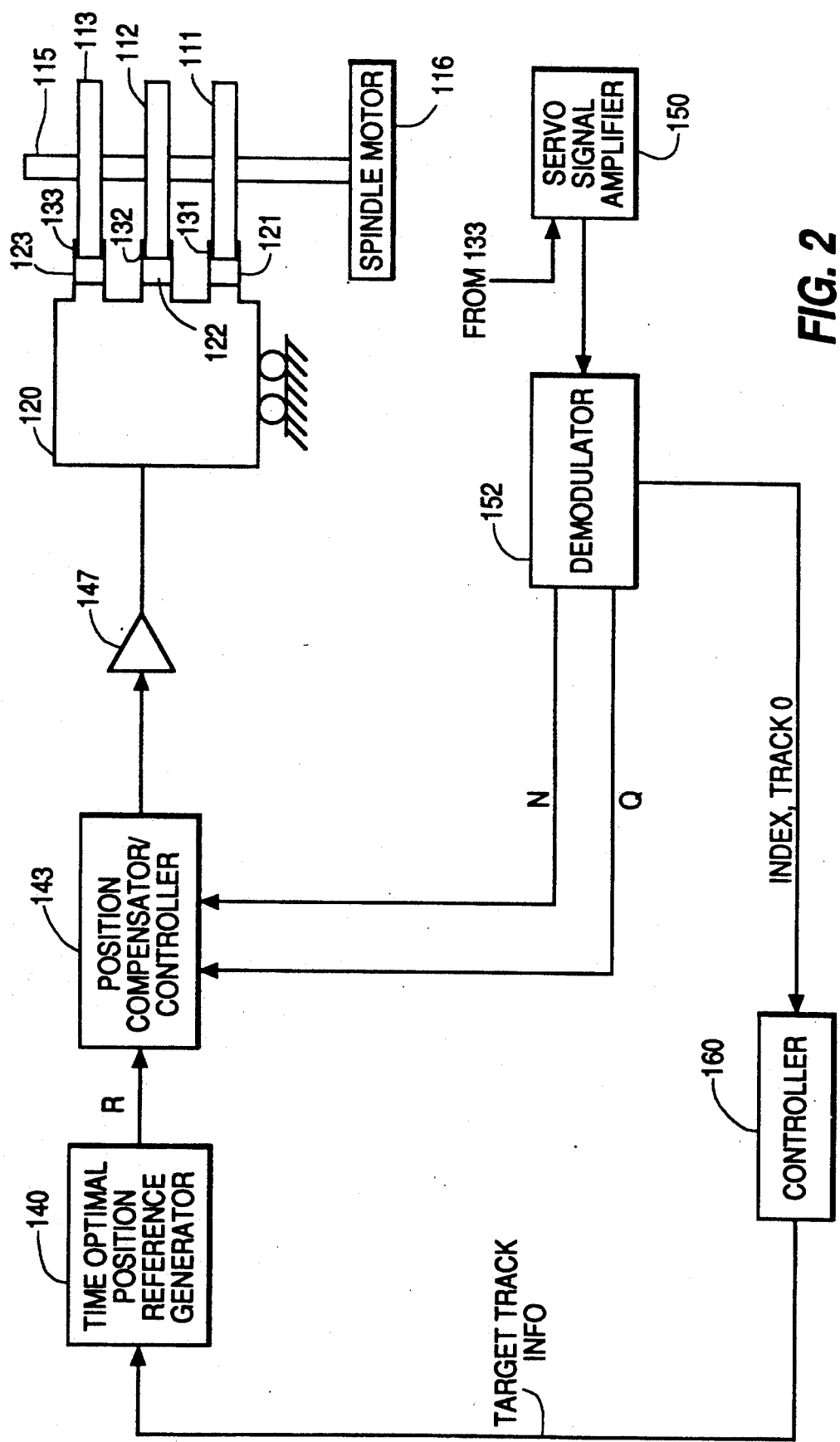
FIG. 2 is a schematic block diagram of a disk drive system in accordance with the principles of this invention.

FIG. 2 is a block diagram of a system 110 in accordance with the principles of this invention. The system does not employ actuator velocity feedback in the positioning of the actuator as will become clear. The system includes a plurality of disks 111, 112, and 113, disk 113 being the dedicated servo surface. The disks are mounted on spindle 115 and driven by motor 116. The actuator is positioned by motor 120. Actuators 121, 122, and 123 are mounted on motor 120 and heads 131, 132, and 133 are mounted on the corresponding actuators as was the case with the assembly of FIG. 1.

The actuator positioning servo loop comprises a time-optimal position reference generator 140, the output of which is connected to the input of a position compensator/controller 143. The output of controller 143 is connected to the input of current amplifier 147. The output of amplifier 147 is connected to the input of motor 120.

Head 133 is connected to an input to servo signal amplifier 150. The output of amplifier 150 is connected to the input of demodulator 152. First and second outputs of demodulator 152 (the N and Q outputs) are connected to position controller 143. An output of demodulator 152 is also connected to controller 160 and the output of controller 160 is connected to the input to reference generator 140.

The operation of the system of FIG. 2 is similar to that of FIG. 1 except that only a single servo loop exists and no velocity feedback is involved in the control of the actuator movement. Instead, the servo loop provides actuator position information to be compared with a reference signal generated according to an algorithm embodied in FIG. 3.

The position feedback information is derived from "track crossing" information applied from "servo" head 133 to servo signal amplifier 150. The amplified track crossing information is applied to demodulator 152 which generates quadrature N and Q feedback signals common to prior art systems. The quadrature signals are applied to controller 143 the output of which controls the current in motor 120 via current amplifier 147.

For each track seek, there is a unique profile that must be followed to reach a target track in a minimum time. But it is very space consuming and expensive to store and generate each such seek profile. In accordance with the principles of this invention, an algorithm is provided which generates the requisite profile for any track distance for providing a reference signal to the actuator positioning loop. This reference signal can be compensated for in a simple manner without the need for velocity feedback. The reference signal is generated by generator 140 of FIG. 2 in a manner explained in connection with FIG. 3.

Figure 3:
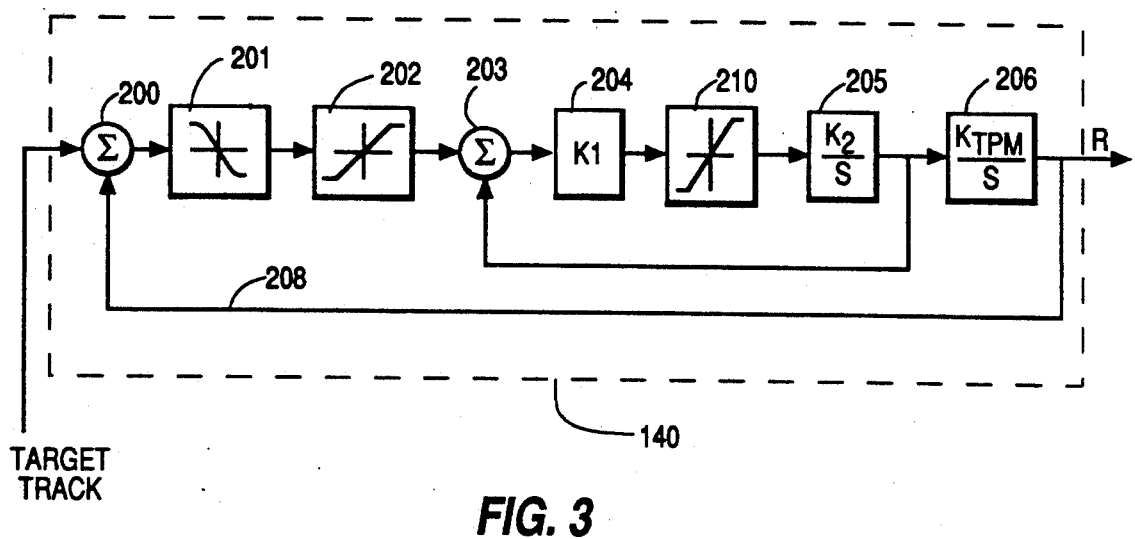
FIG. 3 is a schematic block diagram of the functional operation of a portion of the system of FIG. 1.

FIG. 3 is a block diagram of the algorithm functions embodied in generator 140. Target track identification information and the reference signal are summed as indicated at block 200 in FIG. 3. The reference signal (R) is being recalculated in real time and summed with the target track information.

The output of block 200 is the error signal. That is to say, the difference between the target track and the reference signal at any instance is the error signal. The reference signal is applied to the input of block 201. Block 201 represents a square root type function generator equivalent to block 43 of FIG. 1. Thus, block 201 represents the generation of the square root of the error function.

Block 202 represents a limiting function. The limiting function is a function based on the maximum velocity of the system calculated in a manner well known in the art to be a calculation determined by the motor force, the mass of the actuator and time. The so-limited square root of the error function is applied to the input of block 203.

Block 203 represents the difference between the output of block 202 and the derivative of the position reference signal (R). The output of block 203 is applied to the input of block 204 which represents the gain (K) of the system of FIG. 2 selected to be a value as high as possible to make the loop of FIG. 3 stable. The output of block 204 is applied to the input of block 205. Block 205 represents the integration of the square root of the limited error function times the gain factor which integration is the derivative of the position reference signal (R). The derivative of R is integrated, as indicated by block 206, to generate the position reference signal R. The reference signal is applied to the summing function generator represented by block 200 via feedback loop 208. Feedback loop 209 provides the path through which the derivative of R (the output of block 205) is applied to the input of the summing function generator represented by block 203.

The square root function represented by block 201 is implemented in a look up table as a constant calculated for any error signal. By selecting that constant, the system limiting value and the gain, an optimal position reference profile can be provided in real time for any selected target track. The constant, the limiting value and the gain are determined by setting the error signal equal to the square root of the value—twice the maximum allowable acceleration times the square root of the error signal.

Figure 4:
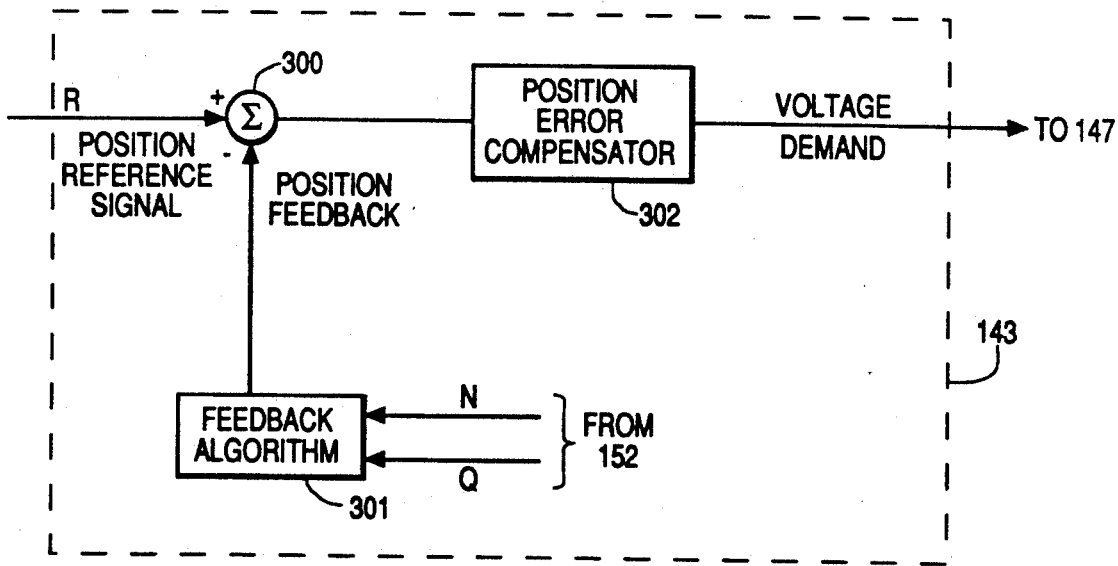
FIGS. 4, 5, and 6 are schematic block diagrams of the circuit elements of the components of the system of FIG. 2.
Figure 5:
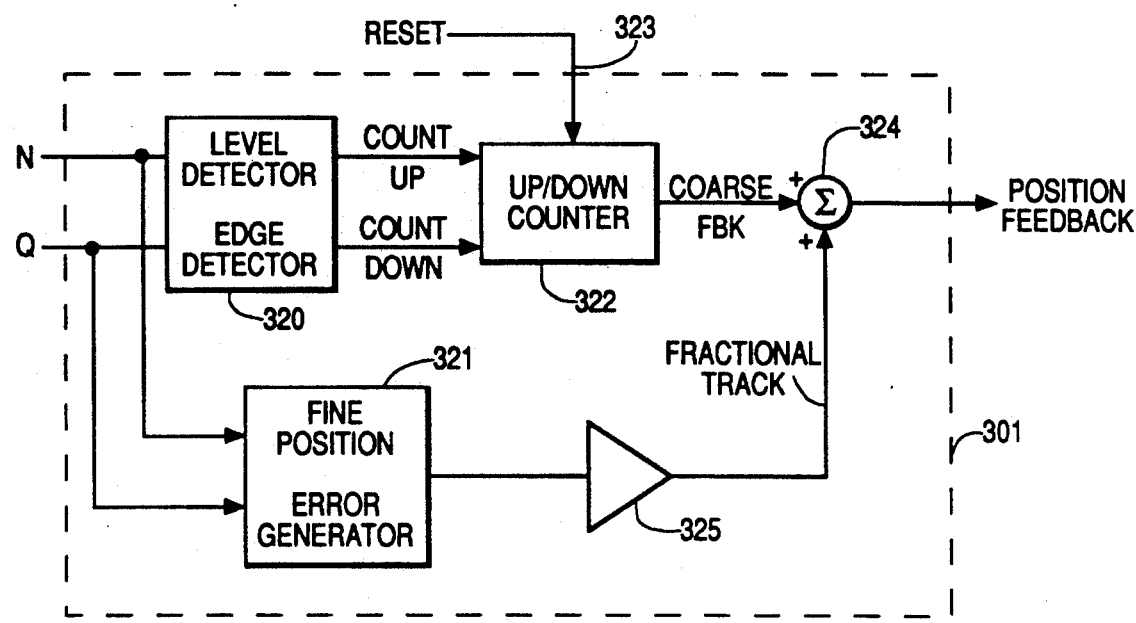

The output of optimal position reference signal generator 140 of FIG. 1 is applied to position compensator/controller 143 which, in turn, generates a voltage demand for the input of amplifier 147 of FIG. 1. FIGS. 4 and 5 show the details of the position compensator/controller.

The position compensator/controller includes a summing function represented by the encircled summation sign at 300. The summing function is operative on the position reference signal from generator 140 of FIG. 2 and on the position feedback (N and Q) signals from demodulator 152 of FIG. 2. The position feedback signals are processed according to a feedback algorithm as indicated by block 301 of FIG. 4.

FIG. 5 shows a block diagram representative of the feedback algorithm in a manner well understood in the art. Specifically, the N and Q quadrature signals representative of track crossings in first and second directions, are applied to a level and edge detector in a well known manner as indicated by block 320 in FIG. 5. The N and Q signals are also applied to a fine position error generator represented by block 321 in FIG. 5. Detector 320 generates count up and down signals which are applied to up/down counter 322. Counter 322 is reset or initialized to a reference track via a reset signal applied to representative line 323 in a conventional manner.

The output of counter 322 is applied to the input of block 324, an encircled summation sign, representative of a summing function. Similarly, the output of fine position error generator 321 is applied to analog to digital (A/D) converter 325 and the digital output of the converter is applied to block 324. The servo information may be written on a disk in any conventional manner and may be demodulated in any known manner to provide the requisite positional information for controlling the actuator position. The present invention is directed at the manner and means by which such information is used in the servo control system.

Industry standard servo feedback is called di-bit quadrature with frame rates of 500 khz. Integrated circuits are available commercially to demodulate the 500 khz frame rate pattern to generate the actual positional feedback. One such device has a part number of SSI 32H 6210 and is available from Silicon Systems Corporation.

Figure 6:
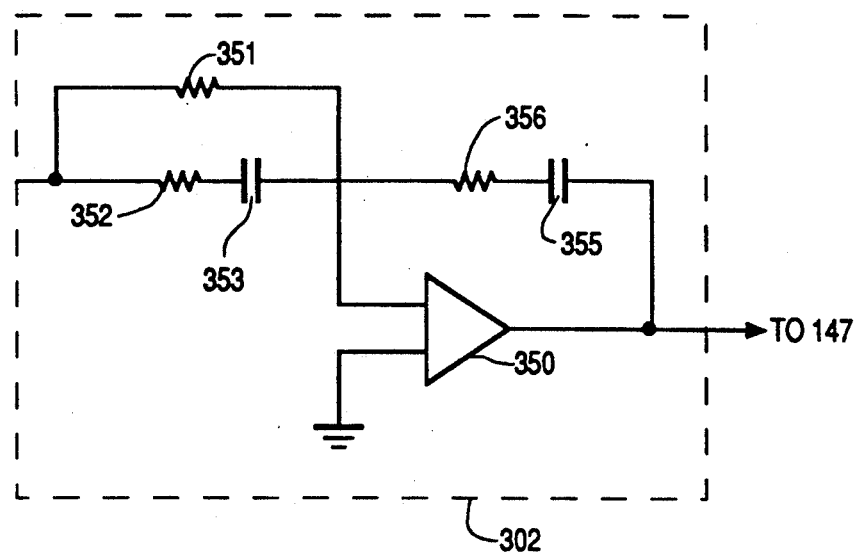

FIG. 6 is a circuit diagram of the position error compensator 302 of FIG. 4. The circuit includes an amplifier 350 having one input (positive) connected to a reference voltage (ground) and another input (negative) connected to an arrangement of a resistor 351 in parallel with a series arrangement of a resistor 352 and a capacitor 353. The output of amplifier 350 is connected to the (negative) input to amplifier 147 of FIG. 2. The output of amplifier 350 also is connected to the (negative) input to the amplifier (350) via a path including capacitor 355 and resistor 356. The components 351, 352, 353, 355, and 356 are chosen so that the position error of compensator/controller 140 of FIG. 2 approaches zero.

The system of FIG. 2 utilizes two types of feedback depending on the mode of operation. During a tracking mode it uses the tracking feedback and during the seek mode it uses the seek feedback. Both provide position feedback information and the information is used in each case by the same servo compensator/controller 143 of FIG. 2.

Figure 7:
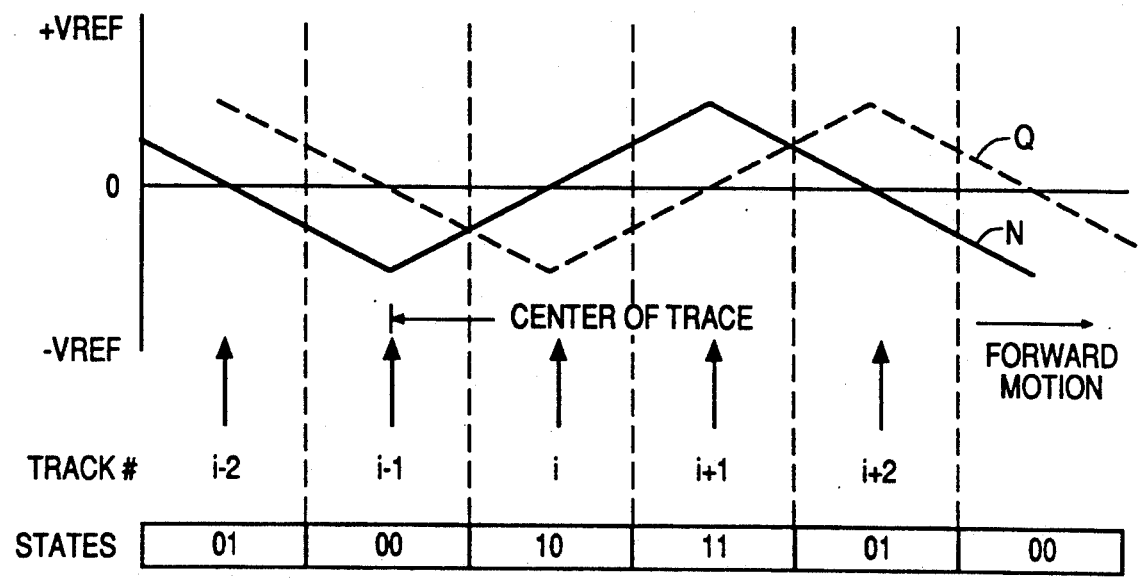
FIGS. 7, 8, 9, 10, and 11 are pulse diagrams of the operation of the system of FIG. 2.

The implementation of the algorithm represented in FIG. 3 requires linear position feedback information. The requisite linear position feedback information is generated with digital means from the conventional N and Q quadrature feedback signals as follows:

Feedback in the seek mode comprises two distinct parts; coarse feedback and fine feedback. FIG. 7 shows a standard graphical representation of the N and Q signals during forward motion of the actuator in accessing a target track. The tracks are designated i−2, i−1, i, i+1, i+2, and i+3 with the center of the tracks being indicated by vertical, upward-pointing arrows as viewed. The plot is of voltage versus time and the N and Q curves can be seen to be saw tooth in shape and identical except that they are out of phase with one another. The "states" for the representative tracks are 01, 00, 10, 01, and 00 respectively as shown in the figure, the pattern being repetitive every four states over the entire disk surface.

Figure 8:
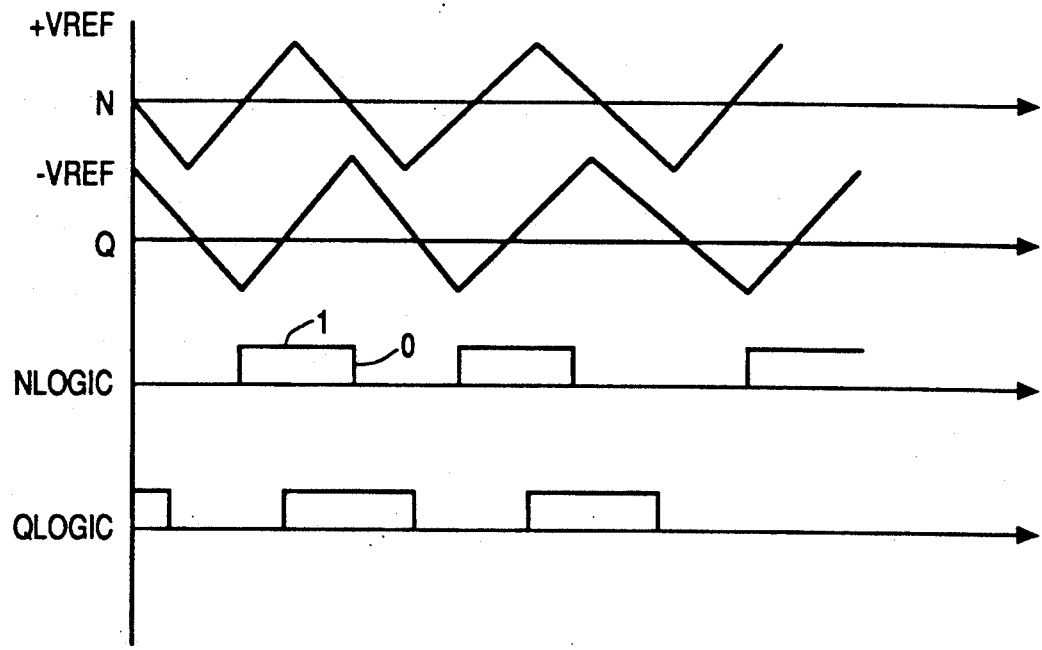
Figure 9:
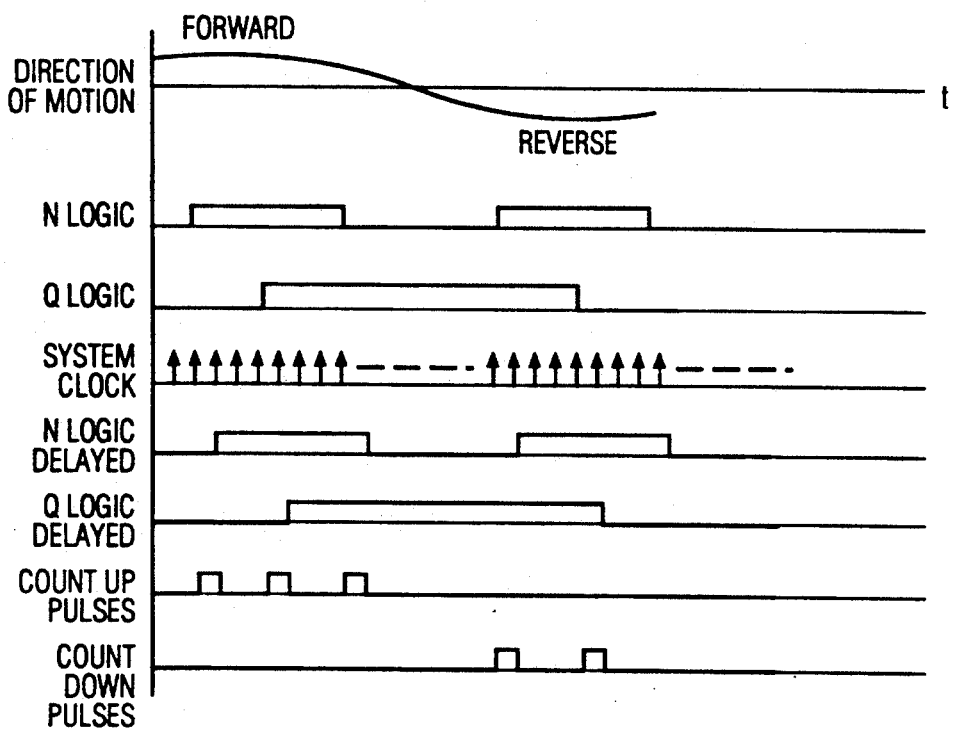

Coarse feedback is simply a track crossing count determined by counter 322 of FIG. 5. FIG. 8 shows graphically the logic one's corresponding to the zero crossings of the associated N and Q sawtooth waveforms of FIG. 7. The N and Q logic is derived from the N and Q analog signals via zero crossing detectors operative to detect the edges of a track when the actuator crosses a track center. FIG. 9 is a graphical representation of the bidirectional counting scheme that generates the coarse seek feedback digital signal. The representations of FIGS. 7, 8, and 9 are consistant with prior art usage and are included herein for completness and for ease of reference. The second part of the seek mode is the fine feedback which is necessary to determine the exact position of the actuator within a given track. The fine feedback part of the coarse mode includes an "initial" seek and a "multiple" seek operation.

The initial seek operation occurs when the servo receives a new target command and starts to move in the correct direction continuing until the actuator arrives at the center of the next track. The feedback selection in the initial seek operation depends on the state the servo was in during the tracking mode and the direction (forward or reverse) of the seek travel. The states of the servo are shown in FIG. 7. Depending on the state and the direction, one of the signals N, −N, Q, or −Q is selected and converted to a digital signal by an 8-bit A/D converter (325) of FIG. 5. The digital signal provides an absolute position for the selected signal.

During the tracking mode, the actuator is positioned so that N or Q is exactly at zero potential in one of the four states 00, 01, 11, or 10. The selection of a particular state is made according to the following truth table: Note that the selected feedback (N, −N, Q, or −Q) moves to −Vref from a track center location as the actuator moves forward.

TRUTH TABLE

| DIRECTION | STATE | | INITIAL SEEK FEEDBACK |
|---|---|---|---|
| FWD | 00 | 0 | N |
| FWD | 01 | 1 | −Q |
| FWD | 10 | 2 | Q |
| FWD | 11 | 3 | −N |
| REV | 00 | 0 | −Q |
| REV | 01 | 1 | −N |
| REV | 10 | 2 | N |
| REV | 11 | 3 | Q |

Thus, an absolute positional feedback is provided via an up/down counter from the conventional N and Q logic signals.

Figure 10:
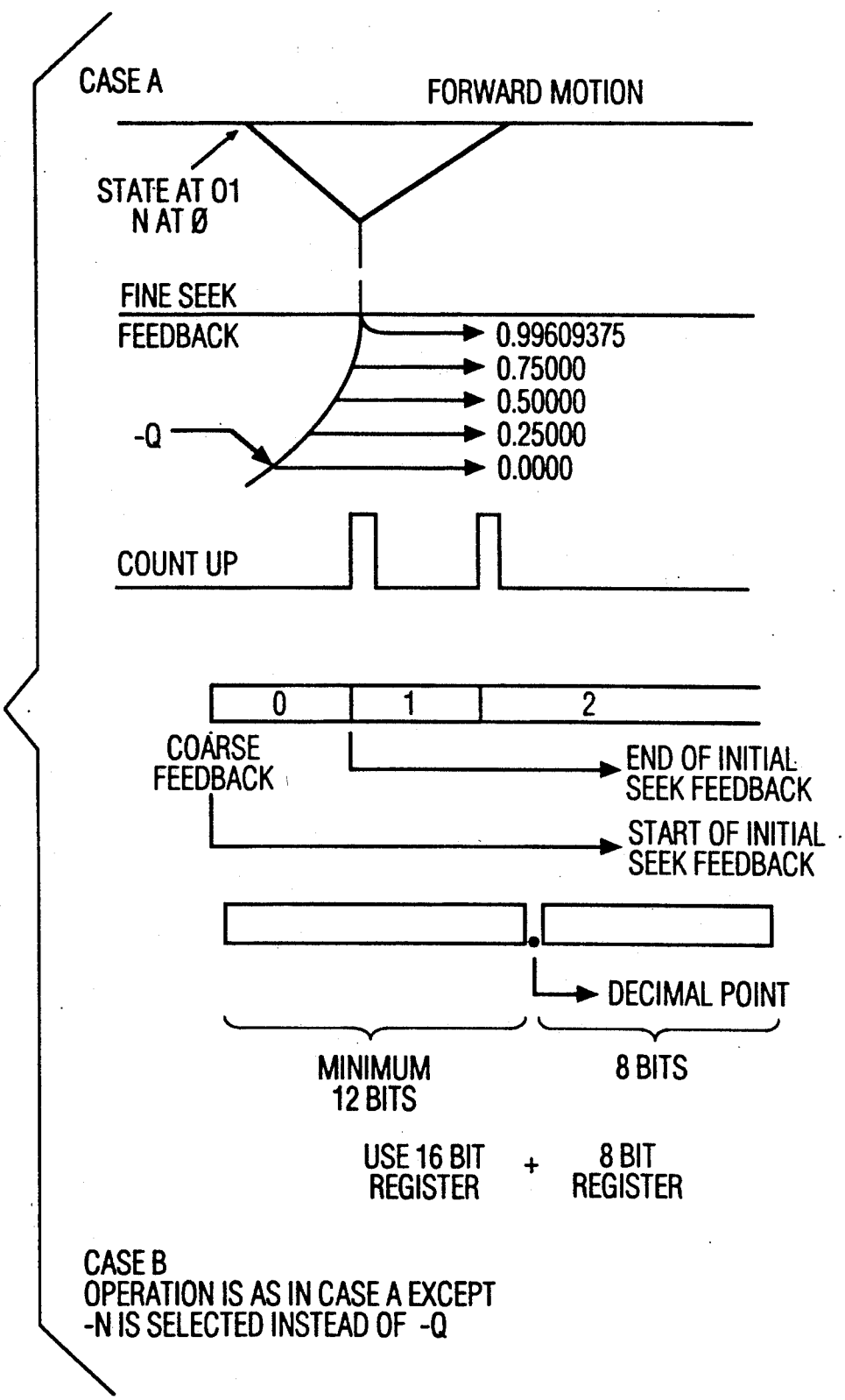

Consider an example where the actuator is at the center of, say, track 99 and the system is in state 01.. FIG. 10 illustrates the operation for the forward case (A) and the reverse case (B) motion of the actuator. A sequence of fine feedback values is generated. The count up pulses are illustrated in registry with the track crossings and the start and end of the initial seek feedback are shown.

The coarse counter is disabled from counting up or down for one half track movement of the actuator to avoid extraneous track movements causing erroneous incrementing or decrementing of the counter. To permit the measuring of the actuator movement over a one half track distance, the half way point is detected by measuring N−Q and N+Q signals. When these signals have zero crossings, the actuator has moved half way into a next track.

The multiple seek operation of the fine feedback part of the seek mode occurs after the first increment or decrement of the coarse counter. During the multiple seek operation, the coarse counter continues to operate as before except that the fine feedback selection is made using a different truth table:

TRUTH TABLE

| DIRECTION | N LOGIC | Q LOGIC | STATE | SELECT |
|---|---|---|---|---|
| FWD | 0 | 0 | 0 | N |
| FWD | 0 | 1 | 1 | −Q |
| FWD | 1 | 0 | 2 | Q |
| FWD | 1 | 1 | 3 | −N |
| REV | 0 | 0 | 0 | N |
| REV | 0 | 1 | 1 | −Q |
| REV | 1 | 0 | 2 | Q |
| REV | 1 | 1 | 3 | −N |

The feedback representations herein comprise a 24-bit representation of the total track travel distance with coarse and fine feedback. The overall 24-bit word is said to be the seek feedback; 16 bits are the coarse value; the fractional 8 bits are the absolute position information within a given track. The output of generator 140 of FIG. 2 (the R value) also must be represented as a 24-bit word. But since the compensation, defined in FIG. 3, ensures that the seek feedback follows the R reference signal with a finite error, the actual compensation algorithm (of FIG. 3) can be executed by a word length of much less than 24 bits such as 16 bits or less.

At the end of the seek mode, based on the linear feedback method here disclosed (due to the in-loop integrator), the error (R-the seek feedback) will be zero regardless of friction or other external disturbances. At this point in the operation, the servo is stable and within the final settling error budget. At this juncture, a mode change command is issued to generate a different feedback (tracking feedback) with a new position reference to the compensator.

Figure 11:
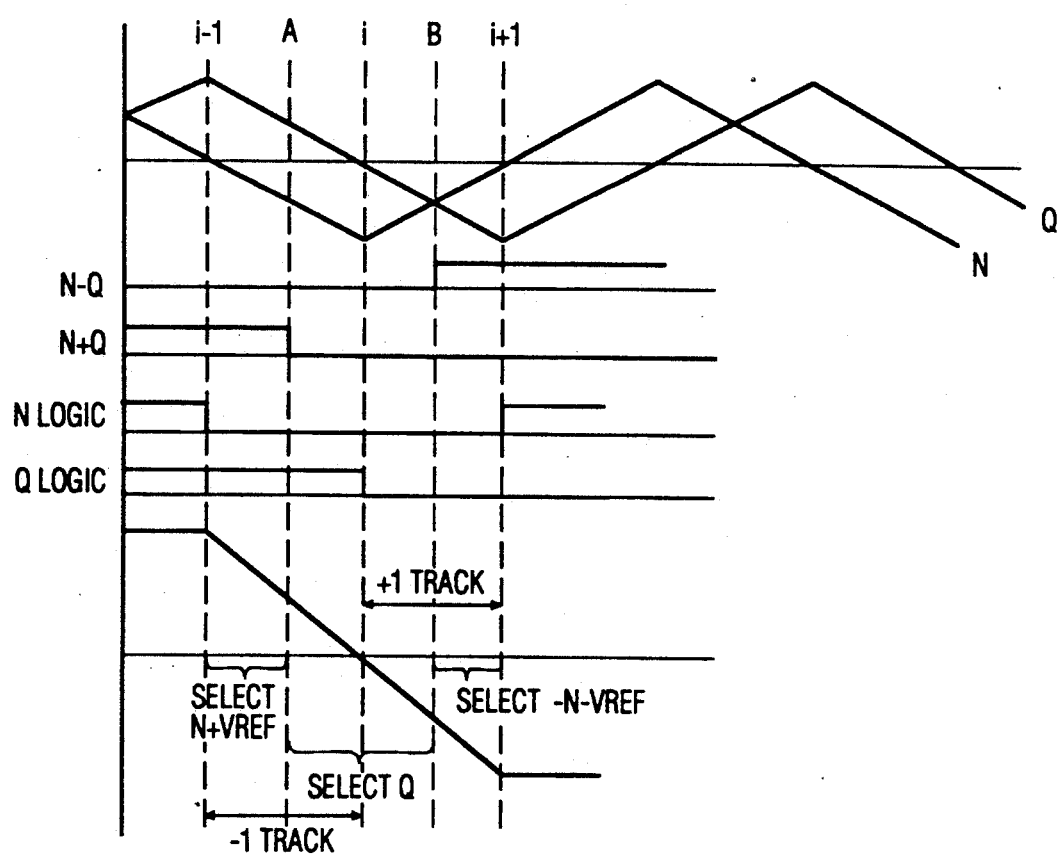

The tracking feedback operation proceeds as follows and is unique because it avoids of the actuator moving unintentionally to a nonselected track due to shock or vibration. FIG. 11 shows the tracking feedback algorithm for the system state 00 (see FIG. 7). In state 00, Q is being tracked. For a plus or minus one half track distance from the center of track i, Q is the selected feedback and it is linear from plus Vref/2 to −Vref/2 qualified by N−Q and N+Q low. When N−Q is low and N+Q is high, the actuator is between track i-1 center and point A. At this juncture, Q starts to deviate from a linear function. But N is linear. The feedback is kept linear and continuous with the previously-selected Q, Vref is added to N, and the selected feedback becomes N+Vref.

As the actuator moves further from the center of track i past the center of track i-1, N+Vref is no longer linear and the feedback is saturated to ensure that the compensator is operative to move the actuator back towards the center of track i. Saturation of the feedback occurs when N and Q logic are both high in contradistinction to the first two instances where the selected feedback signals Q and N+Vref were low. If the actuator moves in the opposite direction towards track i+1, when the N logic signal is low and N−Q and N+Q are high and low respectively, the selected feedback is −N−Vref. When the N logic signal is high and the Q logic signal islow, the saturation voltage is selected as −Rref.. The operation is summarized in the following truth table:

TRUTH TABLE

| STATE | LOGICAL DECISION | FEEDBACK |
|---|---|---|
| 00=0 | $\overline{N-Q}$ N+Q $\overline{N\ LOGIC}$ | Q |
|  | $\overline{N-Q}$ N+Q $\overline{N\ LOGIC}$ | N+Vref |
|  | N−Q $\overline{N+Q}$ $\overline{N\ LOGIC}$ | −N−Vref |
|  | N LOGIC Q LOGIC | +Vref |
|  | N LOGIC Q LOGIC | −Vref |
| 01=1 | $\overline{N-Q}$ N+Q Q LOGIC | N |
|  | N−Q N+Q Q LOGIC | −Q+Vref |
|  | $\overline{N-Q}$ $\overline{N+Q}$ Q LOGIC | Q−Vref |
|  | $\overline{Q\ LOGIC}$ N LOGIC | Vref |
|  | $\overline{Q\ LOGIC}$ N LOGIC | −Vref |
| 10=2 | N−Q $\overline{N+Q}$ $\overline{Q\ LOGIC}$ | −N |
|  | $\overline{N-Q}$ $\overline{N+Q}$ Q LOGIC | Q+Vref |
|  | N−Q N+Q $\overline{Q\ LOGIC}$ | −Q−Vref |
|  | Q LOGIC $\overline{N\ LOGIC}$ | Vref |
|  | Q LOGIC N LOGIC | −Vref |
| 11=3 | N−Q N+Q N LOGIC | −Q |

TRUTH TABLE-continued

| STATE | LOGICAL DECISION | FEEDBACK |
|---|---|---|
|  | N−Q $\overline{N+Q}$ N LOGIC | −N+Vref |
|  | N−Q N+Q N LOGIC | N−Vref |
|  | $\overline{N\ LOGIC}$ $\overline{Q\ LOGIC}$ | Vref |
|  | $\overline{N\ LOGIC}$ Q LOGIC | −Vref |

Prior art systems provide linear feedback over a one half track radial displacement from any given track center. In accordance with an aspect of this invention, linear feedback is provided over a range of plus and minus one track, twice the range of prior art systems and is able to lock into a target track without overshoot much more reliably than prior art systems. Also, in prior art systems, the unintentional movement of an actuator by more than one half track from the center of the present track will cause the system to lock into the next track causing malfunctions. In the present system, even if the actuator is moved a full track from the center of the present track, the algorithm provides the correct saturation voltage to the compensator (143 f FIG. 2) for radial displacement of an additional track thereby urging the compensator back to the original track. It is clear that the stable range for the servo is plus or minus two tracks in accordance with the principles of this invention.

Figure 12:
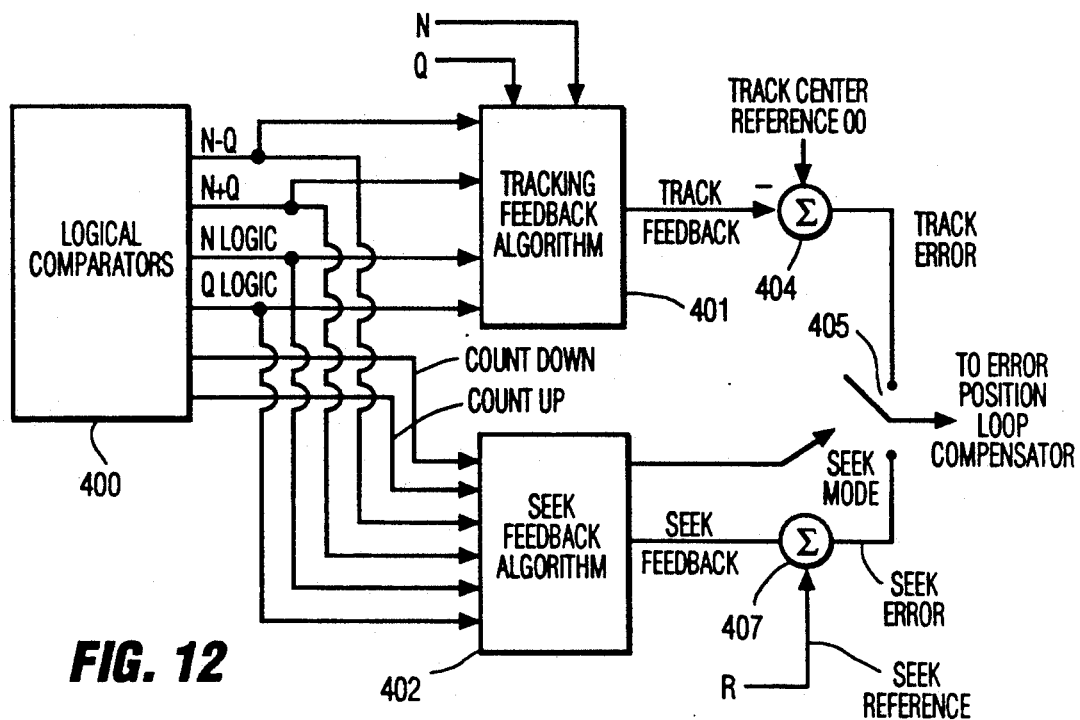
FIGS. 12 and 13 are schematic block diagrams of the information flow and the practical implementation of the system of FIG. 2, respectively.
Figure 13:
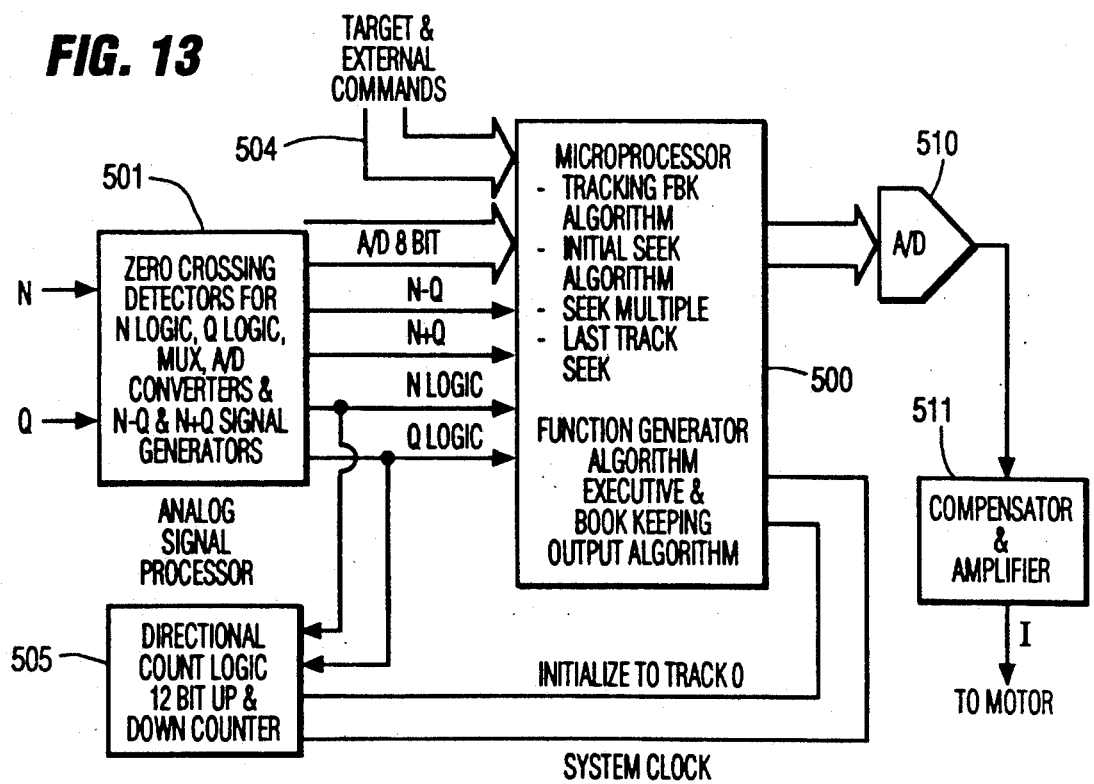

The foregoing explanation of the feedback algorithm for both seek and tracking modes in accordance with the principles of this invention is summarized in connection with the block diagrams of FIGS. 12 and 13. In FIG. 12 the N and Q quadrature signals are applied to logical comparators represented by block 400 and are manipulated according to the track feedback algorithm as represented by block 401. The N−Q, N+Q, N LOGIC, Q LOGIC, COUNT DOWN and COUNT UP signals also are manipulated according to the seek feedback algorithm, these signals all being outputs of comparators 400. The track feedback algorithm provides track feedback information to the summing function generator represented by the encircled summation sign 404 to which track center reference 00 also is supplied. The output of the summing function generator (404) is the track error which is supplied to the error position loop compensator through switch 405 when operation is in the tracking mode.

Seek feedback information similarly is supplied to the summing function generator (407), also to be supplied to the error position loop compensator via switch 405 when operation is in the tracking mode.

FIG. 13 shows a functional block diagram of the servo system. A microprocessor 500 is operative to execute the functions of: 1. the tracking feedback algorithm; 2. the initial seek algorithm; 3. seek multiple; 4. last track seek; 5. function generator algorithm; 6. execute and other bookkeeping functions; 7. output algorithm as indicated in the figure. The N and Q quadrature signals are applied to analog signal processor 501. Processor 501 generates A/D 8-bit digital output signals and N−Q, N+Q, N LOGIC and Q LOGIC signals as indicated as inputs to the microprocessor. Target as well as other external commands are also applied to the microprocessor as indicated by arrow 504.

The N and Q logic signals are also applied to inputs to direction counters represented by block 505. An initialization (to a reference track) signal and system clock pulses are applied to counter 505 by the microprocessor. Counters 505 provide a track location value signal to the microprocessor as indicated by arrow 508.

An output of the microprocessor is applied to inputs to an A/D converter 510 which, in turn, applies a digital signal to compensator 511 corresponding to component 143 of FIG. 2.

The various components of FIGS. 2, 4, 5, 12, and 13 are straight forward to those skilled in the art given the various truth tables herein. With respect to the analog signal processor, N and Q are normally biased around some fixed potential of Vref in standard disk drives. Since those signals are used, as supplied, the interface characteristics must be observed. Vcc thus is 5 volts and Vdd is +12 volts herein. There is no negative voltage present in disk file electronics. Vref, normally is 6 volts for a plus 12 volt system, is the superficial ground.

The analog to digital interface is represented in FIG. 13 as microprocessor 500 and A/D converter 510. Whether or not the interface is so implemented or is implemented with discrete components depends on certain tradeoffs in rate of MIPS, cost and single chip form for the interface as is well understood by those skilled in the art.

The description herein has been rendered under the assumption that there will be an initialization phase where microprocessor 500 of FIG. 13 will move the actuator at low speeds until the actuator comes to a section on a disk where there is data and then finds the reference track for initialization. Since this initialization operation is the same as in prior art systems, the description covers only the tracking and seek operations which follow the initialization procedure.

An algorithm of the type disclosed for use in accordance with the principles of this invention can be found in W LEONARD, "CONTROL OF ELECRICAL DRIVES", SPRINGER-VERLAG, published 1985, pages 311 et seq., "TIME OPTIMAL POSITION CONTROL WITH FIXED TARGET". The algorithm disclosed in that reference was used to control the position of elevators where the required accuracy is relatively gross compared to the requirements of disk files where accuracy has to be less than 1% for 1000 tracks or more. In addition, the feedback system in accordance with the principles of this invention is different in order to satisfy the demands of disk file systems and to produce a relatively robust system.

What is claimed is:

1. A disk drive including a head for accessing information on a disk, said head being mounted on an actuator for moving said head from a start position on said disk to a target position thereon in response to a user command, said disk drive including an actuator control means, said actuator control means including means responsive to a target track number for generating a reference position profile comprising a sequence of position reference signals for controlling the movement of said actuator to said new target position wherein said actuator control means includes a position servo loop for providing information as to the successive positions of said actuator for comparison with said reference signal for generating a succession of position error signals for controlling the movement of said actuator, said servo loop including counter means for generating track crossing signals representing the number of tracks crossed by said head during movement to a target position and the direction of movement of said head, said servo loop also including a demodulator for generating N and Q quadrature signals responsive to said track crossing signals, said disk drive including means responsive to said N and Q quadrature signals for generating $N-Q$ and $N+Q$ signals for controlling said actuator position.

2. A disk drive as set forth in claim 1 wherein said actuator control means also includes a position compensator/controller responsive to each of said sequence of postion error signals for generating voltage demands for controlling said movement of said actuator.

3. A disk drive as set forth in claim 2 also including a motor for moving said actuator, said motor being responsive to said voltage demands from said position compensator/controller for moving said actuator.

4. A disk drive as set forth in claim 3 also including an analog/digital converter for converting said analog N and Q signals to digital representations thereof.

5. A disk drive as set forth in claim 1 wherein said means for generating includes a means responsive to said N, Q, $N-Q$, and $N+Q$ feedback signals for generating an error signal.

6. A disk drive as set forth in claim 5 wherein said means for generating said reference position signal also includes means for generating a second signal representative of the square root of said error signal.

7. A disk drive as set forth in claim 6 wherein said means for generating said reference position signal also includes means for limiting said second signal.

8. A disk drive as set forth in claim 7 wherein said means for generating said reference position signal also includes means for multiplying the limited said second signal by a system gain factor.

9. A disk drive as set forth in claim 8 wherein said means for generating said reference position signal also includes means for integrating said second signal times said gain factor for generating said optimal position reference signal.

10. A disk drive as set forth in claim 9 wherein said disk drive also includes means for summing said optimal position reference signal and said digital representations of said N and Q quadrature signals.

11. A disk drive system including a head for accessing information on a disk, said head being mounted on an actuator for moving said head from a start position on said disk to a target position thereon in response to a user command, said disk drive including an actuator control means, said actuator control means including means for detecting track crossing signals and a servo loop including means responsive to said track crossing signals for generating digital representations of N and Q quadrature signals representative of track crossing information, said system also including means responsive to said N and Q quadrature signals for generating digital representations of $N-Q$ and $N+Q$ signals, said system also including means responsive to said $N-Q$ and $N+Q$ signal for generating a succession of position error signals for controlling the incremental movement of said actuator.

12. A system as set forth in claim 11 also including means responsive to said digital representations of said $N-Q$ and $N+Q$ signals and said optimal position reference signal for generating said position error signal.

13. A method for moving an actuator in a disk drive system for repositioning a head from a resident track to a target track, said method comprising the steps of detecting track crossing signals and responsive to said signals generating digital representations of N and Q quadrature signals representative of the number of track crossings and the direction of movement of said head in moving to said target track, generating $N-Q$ and $N+Q$ signals responsive to said N and Q quadrature signals, generating an optimal reference position signal for said target track responsive to said N, Q, $N-Q$ and $N+Q$ signals, summing said signals for generating a succession of position error signals, and generating a succession of voltage demands for the incremental movement of said actuator responsive to said position error signals.

14. A method for controlling the movement of a disk file head with respect to the tracks of said disk file for accessing a target track, said head being mounted on an actuator, said method comprising the steps of detecting track crossing signals and responsive to said signals generating a succession of N and Q quadrature signals representative of the number of tracks crossed and the direction of head movement towards said target track, generating a succession of $N-Q$ and $N+Q$ signals responsive to said N and Q quadrature signals for providing a succession of linear signal representations of the successive positions of said head, generating an optimal reference position signal for said target track at each of said positions, summing said succession of linear signals and said optimal reference signal for generating a voltage demand responsive to each of said error signals for controlling the movement of said actuator across the next consecutive track.

* * * * *